US 6,772,087 B2

(12) United States Patent
Sasaki (10) Patent No.: US 6,772,087 B2
(45) Date of Patent: Aug. 3, 2004

(54) ABSOLUTE POSITION MEASURING DEVICE

(75) Inventor: Kouji Sasaki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/339,572

(22) Filed: Jan. 10, 2003

(65) Prior Publication Data

US 2003/0135347 A1 Jul. 17, 2003

(30) Foreign Application Priority Data

Jan. 11, 2002 (JP) ........................................ 2002-004799

(51) Int. Cl.$^7$ ............................................. G06F 15/00
(52) U.S. Cl. ..................................... 702/150; 324/662
(58) Field of Search ........................ 702/150; 324/662; 341/13; 250/231.16; 33/544.6

(56) References Cited

U.S. PATENT DOCUMENTS

| 4,536,963 | A | * | 8/1985 | Yamamoto et al. | ........ | 33/544.6 |
| 4,786,891 | A | * | 11/1988 | Ueda et al. | ................... | 341/13 |
| 5,920,198 | A | * | 7/1999 | Suzuki et al. | ............... | 324/662 |
| 6,232,595 | B1 | * | 5/2001 | Okamuro et al. | ...... | 250/231.16 |
| 6,466,889 | B1 | * | 10/2002 | Schodlbauer | ............... | 702/150 |

FOREIGN PATENT DOCUMENTS

| DE | 196 32 656 A1 | 2/1998 |
| DE | 198 49 554 C1 | 3/2000 |
| EP | 0 831 300 A2 | 3/1998 |
| JP | B2 3-79647 | 12/1991 |
| JP | WO 97/01078 A1 | 1/1997 |

* cited by examiner

*Primary Examiner*—John Barlow.
*Assistant Examiner*—Xiuqin Sun
(74) *Attorney, Agent, or Firm*—Oliff & Berridge, PLC (57) ABSTRACT

The absolute position measuring device comprises a main body, a spindle provided movably in the main body, two sets of rotary encoders, an arithmetical operation section, and a display section. The rotary encoders originate two phase signals of different periods in accordance with the amount of movement of the spindle. The arithmetical operation section makes arithmetical operation on the phase signal to obtain the absolute position of the spindle. The display section displays the absolute position in digital format. The two phase signals have a different phase difference at a different position of the spindle. The arithmetical operation section comprises phase signal processing section for comparing the two phase signals to obtain a phase difference between the phase signals, and absolute position calculating section for calculating the absolute position of the spindle from the phase difference obtained by the phase signal processing section.

15 Claims, 10 Drawing Sheets

ABSOLUTE POSITION MEASURING DEVICE

BACKGROUND OF THE PRESENT INVENTION

1. Field of the Present Invention

The present invention relates to an absolute position measuring device. More particularly, the present invention relates to an absolute position measuring device for measuring the position of a spindle in absolute format in a micrometer head, a micrometer, or a hole test, for example.

2. Description of the Related Art

In the small measuring instruments for measuring the length, size or angle, for example, the micrometer and the micrometer head, a measurement object is measured by detecting the information as to the relative movement amount of a movable member to a fixed member.

The methods for measuring the relative movement amount of the movable member to the fixed member include the increment type, which the present applicant has disclosed in Japanese patent examined publication No. Hei. 3-79647, and the absolute type.

Figure 10:
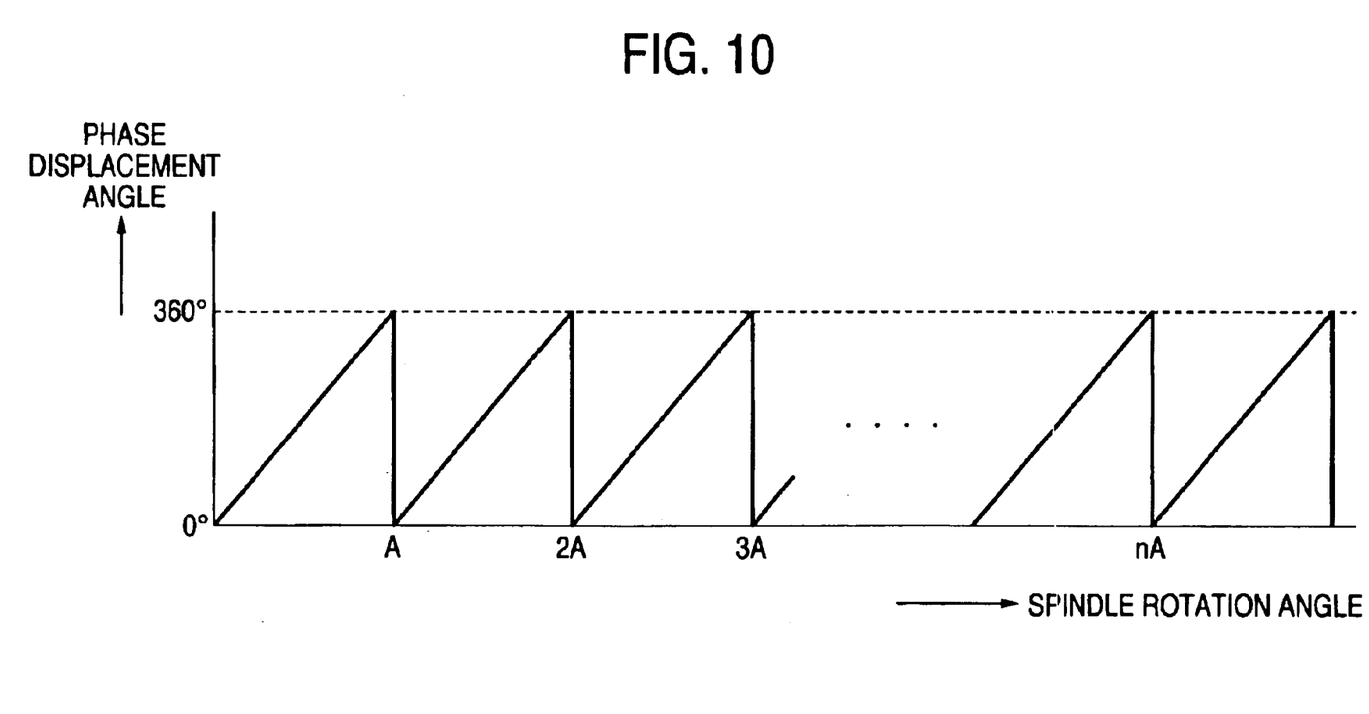
FIG. 10 is a graph showing the change of the phase signal in the related art.

The former comprises a fixed member, a movable member provided movably with respect to the fixed member, and an electrostatic capacity sensor for sensing the phase of a period signal that is originated according to the movement of the movable member. In this constitution, if the movable member is moved, a phase signal periodically changing with respect to the movement amount of the movable member (spindle) is sensed by a displacement sensor, as shown in FIG. 10. By counting the variation amount of this phase signal, the movement amount of the movable member is calculated from the relationship between the movement amount of the movable member and the phase period.

The latter involves sensing a plurality of phase signals having different periods that are originated according to the movement amount of the movable member. In this constitution, if the movable member is moved, two or more phase signals having different periods are sensed, so that the absolute position of the spindle is measured from the phases of those phase signals.

For example, a phase signal of long period (non-dense phase signal) and a phase signal of short period (dense phase signal) are sensed. Then, the positions at which the non-dense phase signal and the dense phase signal are situated in one period are obtained via the electric circuits (phase conversion circuit, interpolation circuit, etc.). From the relationship between these phases, at what periodicity the phase of dense phase signal takes place in the periods of the non-dense phase signal is calculated. From this result, the upper digits are calculated from the phase of the non-dense phase signal, and the lower digits are calculated from the phase of the dense phase signal. The calculated upper digits and lower digits are weighted and synthesized.

Herein, the method for specifying the periodicity that the phase of dense phase signal takes place in the periods of the non-dense phase signal involves dividing the phase of non-dense phase signal by the number of periods (steps) of the dense phase signal contained in one period of the non-dense phase signal.

Another method involves calculating the lower digits from a counting pulse obtained by counting a phase difference between the dense phase signal and the reference signal originated separately and synthesizing those lower digits with the upper digits obtained from the non-dense signal.

However, the increment type had the following problems.

(1) Since it is necessary to count a phase signal originated by the movement of the movable member, the device must be always in a counting state, while the movable member is being moved. Also, if the movable member is moved fast, the phase signal is changed at high rate, whereby the counting response rate must be increased to count this phase signal changing at high rate.

(2) Once a counting error occurs and if the user does not become aware of this error, a measurement error occurs. For correct measurement, the reference position of the movable member must be reset (zero set).

(3) Once the power is turned off, the reference position of the movable member must be set again when in use at the next time.

Also, the absolute type had the following problems.

(4) Though it is necessary to detect a phase difference between the non-dense or dense phase signals precisely, it is difficult to assure the precision of phase detection over a wide range. To calculate the absolute position, it is required to have a process for calculating where the dense phase signal is located in the periods of the non-dense phase signal by the logical operation for the phase signals having different periods, weighting each period, and synthesizing the phase signals, with the very complex operation steps.

(5) Besides, the method for counting the counting pulse with respect to the reference signal needs a synchronous modulation control, which is very intricate. To increase the measurement precision, it is possible to utilize the signals of three different modes of non-dense, intermediate and dense. However, the data processing is so complex that the display of data does not often follow the fast movement of the movable member. If the data processing is tried to make at high speed, the data processing unit is obliged to increase in size, resulting in a problem that this method is unsuitable for the measuring instrument of hand tool type.

SUMMARY OF THE PRESENT INVENTION

The present invention has been achieved to solve the above-mentioned problems associated with the related art. It is an object of the present invention to provide an absolute position measuring device that can detect the absolute position correctly with a smaller size of the device and a simple constitution.

In order to accomplish the object above, the following means are adopted. According to a first aspect of the present invention, there is provided an absolute position measuring device comprises:

a main body;

a movable member provided movably in the main body;

a phase signal originating section for originating two or more phase signals of different periods in accordance with an amount of movement of the movable member; and an arithmetical operation section for making an arithmetical operation on the phase signals to obtain an absolute position of the movable member, the arithmetical operation section including a phase signal processing section for comparing the phase signals to obtain a phase difference between the phase signals, and an absolute position calculating section for calculating the absolute position of the movable member from the phase difference obtained by the phase signal processing section, wherein the two or more phase signals have different phase differences at different positions of the movable member in a movable area of the movable member.

With this constitution, if the movable member is moved, a phase signal having a different period is originated from the phase signal originating section, and the arithmetical operation section makes the arithmetical operation on this phase signal. At this time, the phase signal originated by the phase signal originating section is firstly processed by the phase signal processing section in the arithmetical operation section to obtain a phase difference. Since this phase difference is varied at a different position of the movable member, the absolute position of the movable member can be uniquely obtained from the phase difference. Thus, the absolute position of the movable member is calculated on the basis of the phase difference obtained by the phase signal processing section by the absolute position calculating section. This absolute position is displayed in digital format by the display section, whereby the absolute position of the movable member can be known.

In related art, the upper digits were obtained by calculating the periodicity that the dense signal is located in the periods of the non-dense signal through the arithmetical operation on the non-dense and dense phase signals. Furthermore, the lower digits were obtained from the dense signal, and the upper and lower digits were synthesized. However, with this invention, the absolute value can be uniquely obtained from the phase difference. Hence, by making the arithmetical operation section a simple constitution, the miniaturization is allowed, the fast arithmetical operation is enabled, and the cost is reduced.

According to a second aspect of the present invention, in the absolute position measuring device as defined in the first aspect of the present invention, it is preferable that the absolute position calculating section calculates a periodicity to which any one of the phase signals corresponds from a reference point on the basis of the phase difference, calculates the amount of movement of the movable member corresponding to a phase variation amount based on the periodicity, and the amount of movement of the movable member corresponding to a phase variation amount of any one of the phase signals, and calculates a total amount of movement of the movable member by synthesizing the amount of movement of the movable member based on the periodicity and the amount of movement of the movable member corresponding to the phase variation amount of any one of the phase signals, thereby calculating the absolute position of the movable member.

With this constitution, first of all, the periodicity to which any one of the phase signals corresponds from the reference point is calculated. The phase difference obtained by the phase signal processing section is varied at different position of the movable member, and thereby has a certain width for different periodicity. Hence, the periodicity of any one of the phase signals is uniquely decided as, for example, "N-th period", from the obtained phase difference. If the periodicity N is decided, the phase variation amount by which any one of the phase signals has passed up to this periodicity N is obtained. Then, the movement amount by which the movable member has moved up to the periodicity N is obtained from the periodicity N and the movement pitch per period of the movable member. Also, the movement amount by which the movable member has moved from the periodicity N to any one of the phase signals from any one of the phase signals and the movement pitch per period of the movable member. The total movement amount of the movable member from the reference point is obtained by synthesizing the movement amount by which the movable member has moved up to the periodicity N and the movement amount by which the movable member has moved from the periodicity N to any one of the phase signals.

With this invention, the phase signal directly reflected to the absolute position of the movable member is any one of the phase signals, which is required to be precise. The remaining phase signals are only employed to obtain the periodicity from the phase differences by comparison with any one phase signal, whereby an error is allowable to the extent that the periodicity is not misread. Hence, with the constitution of originating the phase signal and detecting the phase signal not requiring any precision operation, the processing steps are cut down and the cost is reduced.

According to a third aspect of the present invention, in the absolute position measuring device as defined in the first aspect of the present invention, it is preferable that the absolute position calculating section calculates a periodicity to which any one of the phase signals corresponds from a reference point on the basis of the phase difference, calculates a total phase variation amount from the phase variation amount based on the periodicity and a phase variation amount of any one of the phase signals, and calculates the absolute position of the movable member on the basis of the total phase variation amount.

With this constitution, the periodicity to which any one of the phase signals corresponds from the reference point is calculated. The phase difference obtained by the phase signal processing section is varied at different position of the movable member, and there by has a certain width for different periodicity. Hence, the periodicity of anyone of the phase signals is uniquely decided as, for example, "N-th period", from the obtained phase difference. If the periodicity N is decided, the phase variation amount by which any one of the phase signals has passed up to this periodicity N is obtained. Moreover, the total phase by which any one of the phase signals has passed from the reference point is obtained from this phase variation amount and any one of the phase signals. The absolute position of the movable member is decided from the total phase and the pitch of the movable member corresponding to one period of any one of the phase signals.

In related art, the absolute position of the movable member was obtained by synthesizing the positional data of the movable member obtained from all the non-dense and dense signals. Therefore, it was required that all the non-dense and dense phase signals were precise, and the phase signal processing was performed at high precision, resulting in the difficulty of working the parts and the higher cost.

However, with this invention, the phase signal directly reflected to the absolute position of the movable member is any one of the phase signals, which is required to be precise. The remaining phase signals are only employed to obtain the periodicity from the phase differences by comparison with any one phase signal, whereby an error is allowable to the extent that the periodicity is not misread. Hence, with the constitution of originating the phase signal and detecting the phase signal not requiring any precision operation, the processing steps are curtailed and the cost is reduced.

According to a fourth aspect of the present invention, in the absolute position measuring device as defined in the first aspect the present invention, it is preferable that the movable member is a spindle provided to be movable forth or back by rotation in an axial direction thereof, and the phase signal originating section comprises two sets of rotary encoders having a stator fixed to the main body and a rotor opposed to the stator and provided rotatably in conjunction with the rotation of the spindle, wherein the two rotors have different rotational periods, and a different phase difference at a different position of the spindle in the movable area of the spindle.

With this constitution, if the spindle is rotated, the spindle is moved forth or back in the axial direction, and each of the two rotors is rotated along with the rotation of the spindle. When the rotation of the spindle is stopped, the relative rotation phases of two rotors to the stator are detected by the stator. At this time, since the two rotors have a different phase difference at a different position of the spindle, the absolute position of the spindle is decided from this phase difference.

In this invention, two rotors are rotated along with the rotation of the spindle to acquire the phase signal, whereby there is the advantage that two rotors has a different phase difference at different position of the spindle. That is, when one rotor is changed by R periods in the movable area of the spindle, the other rotor has a period change number of R+1 or R−1.

According to a fifth aspect of the present invention, in the absolute position measuring device as defined in the fourth aspect of the present invention, it is preferable that the spindle is inserted independently rotatably through a center of rotation of the rotor and has two key grooves provided around the outer periphery of the spindle, the two rotors are provided with keys engaging the key grooves, and the two key grooves are provided such that the two rotors have different rotational periods, and a different phase difference at a different position of the spindle in the movable area of the spindle.

With this constitution, if the spindle is rotated, each of the two rotors is rotated by the keys engaging the key grooves of the spindle. At this time, two rotors are rotated at different rotation periods and have a different phase difference at different position of the spindle in the movable area of the spindle, whereby the absolute position of the spindle is decided from the phase difference of the rotors.

According to a sixth aspect of the present invention, in the absolute position measuring device as defined in the fifth aspect of the present invention, it is preferable that the two key grooves have different lead angles in the axial direction of the spindle.

With this constitution, since the two key grooves have different lead angles, if the spindle is rotated, the two rotors are rotated at different rotation periods. Hence, the two rotors have a different phase difference at different position of the spindle, whereby the absolute position of the spindle is decided from the phase difference of the rotors.

According to a seventh aspect of the present invention, in the absolute position measuring device as defined in fifth or sixth aspect of the present invention, it is preferable that one of the two key grooves is linearly provided in parallel to the axial direction of the spindle, and the other key groove is provided spirally around the axis of the spindle.

With this constitution, the rotor rotated by the key groove linearly provided and the rotor rotated by the key groove spirally provided can have different rotation periods.

Herein, the key groove linearly provided on the spindle is easy to work at high precision, whereas the spiral key groove is more or less difficult to work at high precision. In related art, because it was required to acquire a plurality of phase signals precisely, it was difficult that the grooves difficult to work were provided to rotate the rotors. However, in the absolute position measuring device of this invention, it is only necessary that any one of the phase signals corresponds to the rotation of the spindle correctly, and other phase signals may be as precise as deriving the periodicity of any one rotor from the phase difference. Hence, the measurement precision can be enhanced by the simple process of working the linear key grooves on the spindle precisely.

According to an eight aspect of the present invention, in the absolute position measuring device as defined in the fourth aspect of the present invention, it is preferable that the two sets of rotary encoders comprise one common stator and two rotors sandwiching the stator.

With this constitution, one phase signal is acquired from one rotor opposed to one face of the common stator, and the other phase signal is acquired from the other rotor opposed to the other face of the common stator. Hence, two different phase signals can be obtained from one common stator and two rotors to calculate a phase difference. As a result, the absolute position of the spindle is decided.

With this invention, only one stator is necessary, whereby the number of parts is reduced, the miniaturization is made, and the cost is reduced.

According to a ninth aspect of the present invention, in the absolute position measuring device as defined in the fourth aspect of the present invention, it is preferable that the two sets of rotary encoders comprise two stators and two rotors disposed between the two stators.

With this constitution, two rotors sandwiched between two stators are disposed adjacently. Then, the range where the key grooves are cut on the spindle can be narrowed. The feed screw is also cut on the spindle, but it is difficult to cut this feed screw and the key grooves in the same range. In order to miniaturize the measuring instrument itself, it is desired that the other portion than the feed screw is as short as possible. With this invention, it is possible to minimize the range where the key grooves are cut, leading to the miniaturization of the measuring instrument itself.

According to a tenth aspect of the present invention, in the absolute position measuring device as defined in the fourth aspect of the present invention, it is preferable that the two rotors consist of a first rotor and a second rotor, the spindle being inserted independently rotatably through the center of rotation of the first and second rotors, a first key is provided around an outer periphery of the spindle, the first rotor has a first key groove engaging the first key and a second key around an outer periphery thereof, the second rotor has a second key groove engaging the second key, wherein the two key grooves are provided such that the two rotors have different rotational periods, and a different phase difference at a different position of the spindle in the movable area of the spindle.

With this constitution, if the spindle is rotated, the first rotor is rotated by engagement between the first key and the first key groove. If the first rotor is rotated, the second rotor is rotated by engagement between the second key and the second key groove. Then, two rotors have a different phase at different position of the spindle in the movable area of the spindle, whereby the absolute position of the spindle is decided from the phase difference between these two rotors.

According to a eleventh aspect of the present invention, in the absolute position measuring device as defined in the tenth aspect of the present invention, it is preferable that the first key groove and the second key groove have different lead angles in the axial direction of the spindle.

With this constitution, if the spindle is rotated, two rotors are rotated at different rotational periods. That is, the rotational phase of the first rotor with respect to the spindle is defined by the lead angle of the first key groove, and the rotational phase of the second rotor with respect to the first rotor is defined by the second key groove. Hence, since the two key grooves have different lead angles, the two rotors have a different phase difference at different position of the spindle, whereby the absolute position of the spindle is decided from this phase difference.

According to a twelfth aspect of the present invention, the absolute position measuring device as defined in the tenth or eleventh aspect of the present invention, it is preferable that the first key groove is linearly provided in parallel to the axial direction of the spindle, and the second key groove is provided spirally around the axis of the spindle.

With this constitution, the first rotor rotated by the key groove linearly provided and the second rotor rotated by the key groove spirally provided have different rotational periods. That is, the first rotor is rotated at the same period as the spindle, whereas the second rotor is rotated at a different period from the first rotor.

Herein, since the first key groove is linearly provided and the second key groove is spirally provided, the same effects as in the sixth aspect of the present invention can be achieved. That is, the measurement precision can be enhanced by the simple process of working the linear key grooves on the spindle precisely.

According to a thirteenth aspect of the present invention, in the absolute position measuring device as defined in the fourth aspect of the present invention, it is preferable that the phase signal originating section comprises:

transmitting electrodes, which are provided at regular intervals along a circumferential direction of the stator, for accepting a phase signal from a phase modulator that originates a reference signal of fixed frequency shifted by every 360/n (n is a natural number);

a coupling electrode, which is provided in the rotor, for electrostatically coupling with the transmitting electrodes at a corresponding circumferential position;

a receiving electrode, which is provided in the stator, for electrostatically coupling with the coupling electrode; and a phase signal processing section for converting an electric signal from the receiving electrode into a rotational phase of the rotor.

With this constitution, the phase modulator originates a reference signal of fixed frequency shifted by every 360/n, this phase modulated signal being sent to the transmitting electrodes of the stator. Since the transmitting electrode is electrostatically coupled at the corresponding circumferential position with the coupling electrode of the rotor, the potential appearing on the coupling electrode due to a rotational phase of the rotor is phase modulated with the reference signal. At this time, the potential appearing on the coupling electrode depends on the coupling with the transmitting electrode. The coupling electrode is also electrostatically coupled with the receiving electrode on the stator, so that a change in the potential at the coupling electrode is received by the receiving electrode. The change in the potential received by the receiving electrode is sent to the phase signal processing section for the signal processing, while a phase shift from the reference signal is detected and the relative rotation amount of the rotor to the stator is detected as the relative phase. Hence, the phase difference is obtained by comparing the relative phases, whereby the absolute position of the spindle is obtained.

DETAILED DESCRIPTION OF THE PRESENT INVENTION

The preferred embodiments of the present invention will be described below with reference to the accompanying drawings.

(First Embodiment)

Figure 1:
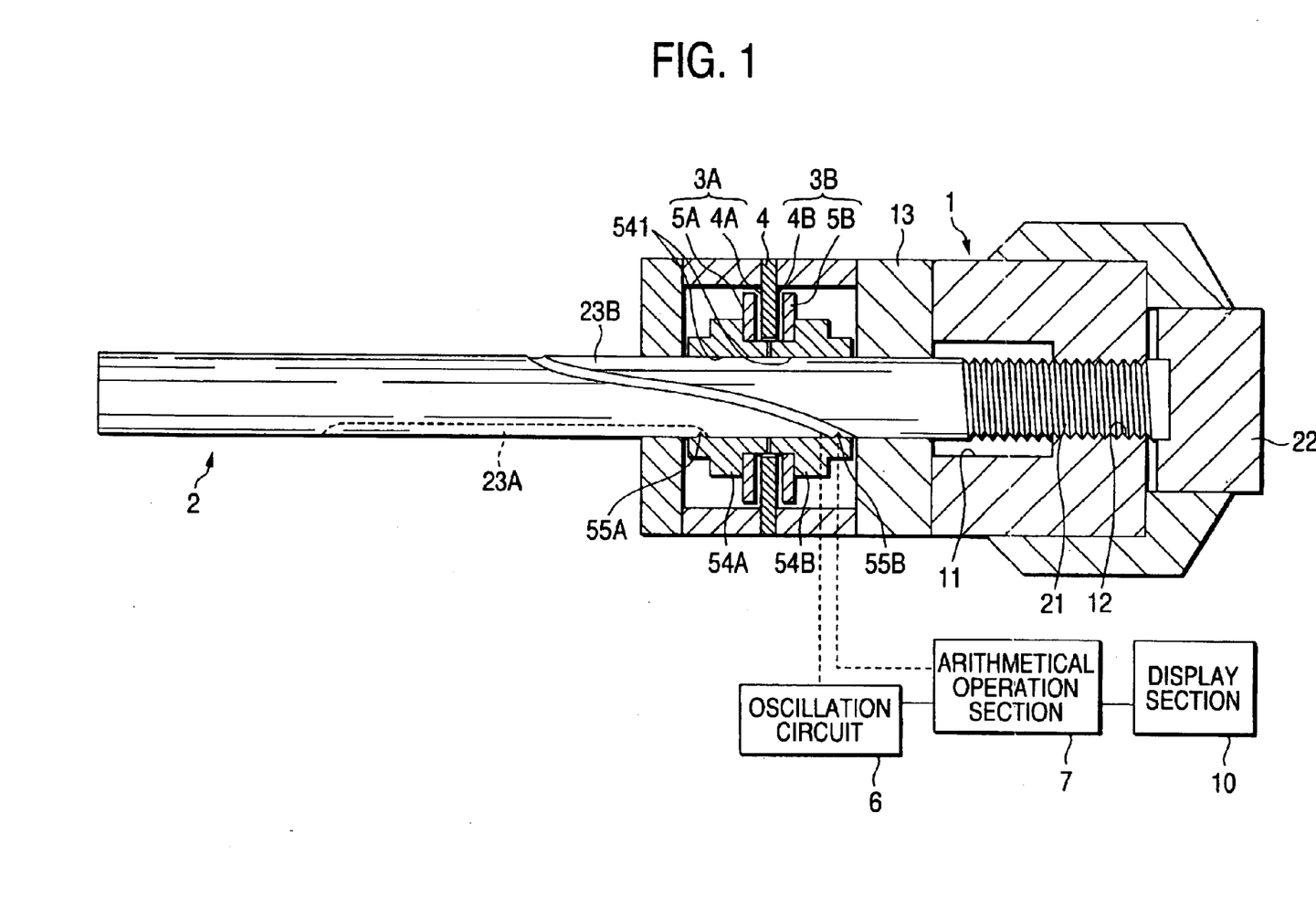
FIG. 1 is a cross-sectional view of an absolute position measuring device according to one embodiment of the present invention.

FIG. 1 shows a micrometer head as an absolute position measuring device according to one embodiment of the present invention.

This micrometer head comprises a main body 1, a spindle 2 as a movable member, an oscillation circuit 6 containing the rotary encoders 3A and 3B as a phase signal originating section and a phase modulator, an arithmetical operation section 7 and a display section 10.

The main body 1 is cylindrical and has a through hole 11, with a female screw 12 provided around the inner periphery at one end of the through hole 11. Within the through hole 11 is provided an intermediate partition plate 13 partitioning a room at the other end of the through hole 11.

The spindle 2 has a feed screw 21 engaging the female screw 12 of the main body 1, and is provided with a knob portion 22 at one end thereof. If this knob portion 22 is rotated, the spindle 2 is moved forth or back in the axial direction by engagement between the female screw 12 of the main body 1 and the feed screw 21. The spindle 2 is moved forth or back 25 mm by 50 rotations of entire stroke. That is, it is moved 0.5 mm per screw pitch.

The spindle 2 is provided with two key grooves 23A and 23B, in which a first key groove 23A is linearly provided in parallel to an axis of the spindle 2, and a second key groove 23B is provided spirally around the spindle 2.

Herein, the second key groove 23B has a different lead angle from the first key groove 23A, and is provided to have a rotational phase difference of 7.272 degrees per rotation of the spindle 2 relative to the first key groove 23A, as will be described later.

Two sets of rotary encoders 3A and 3B are provided, including the first rotary encoders 3A and the second rotary encoders 3B. The constitutions of the first and second rotary encoders 3A and 3B are the same.

That is, the rotary encoders 3A and 3B comprise a stator 4 fixed to the main body 1, and two rotors 5A and 5B opposed to the stator 4 and provided rotatably independently of the stator 2.

Figure 2A:
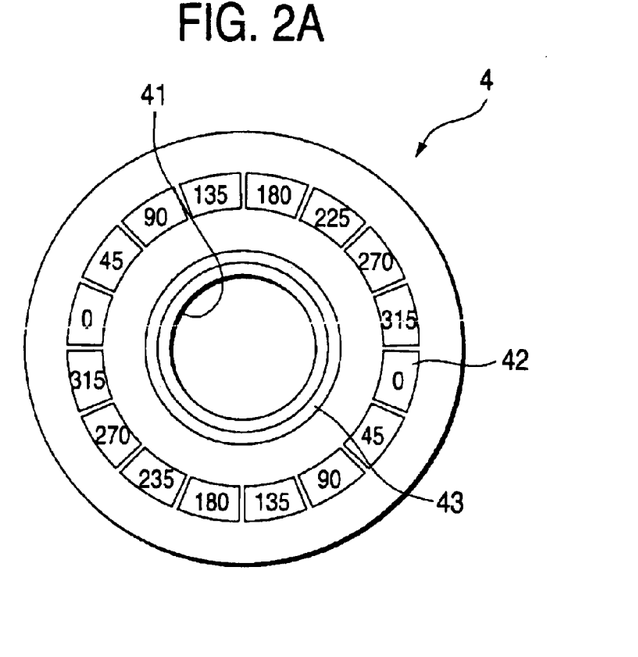
FIG. 2A is a view showing a stator in the embodiment of the present invention.

The stator 4 has an insertion hole 41 through which the spindle 2 is inserted in the center of a disk, and comprises the transmitting electrodes 42 arranged at regular intervals and a receiving electrode 43 like a ring arranged concentrically with the transmitting electrodes 42 along the circumferential direction, as shown in FIG. 2A. Two sets of transmitting electrodes 42 are provided, each set having eight electrodes. A phase modulated signal is sent to the transmitting electrodes 42 from a pulse modulation generator 6, and the receiving electrode 43 sends a signal to arithmetical operation section 7.

Figure 2B:
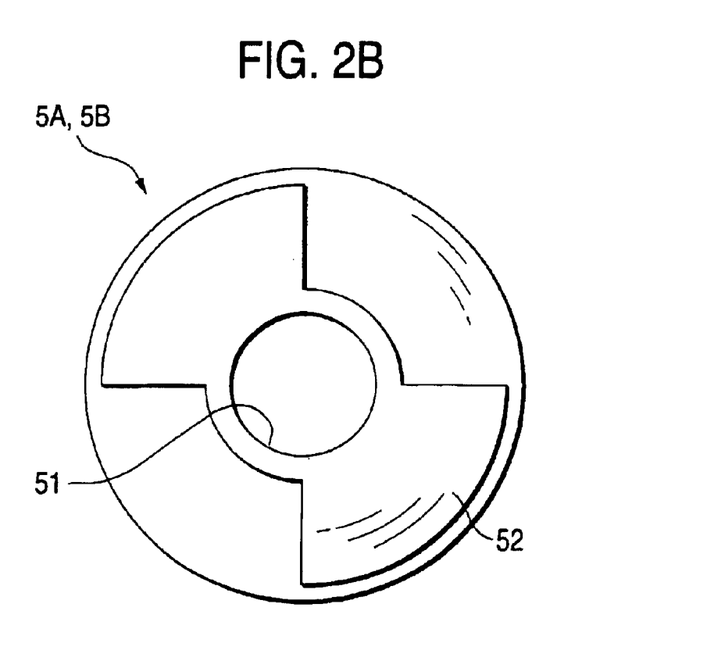
FIG. 2B is a view showing a rotor in the embodiment of the present invention.

The rotors 5A and 5B has an insertion hole 51 through which the spindle 2 is inserted in the center of a disk. Further the rotors 5A and 5B comprises the coupling electrodes 52 opposed which each other to be laid across the transmitting electrodes 42 and the receiving electrode 43 of the stator 4 and electrostatically coupled with four corresponding transmitting electrodes 42, as shown in FIG. 2B.

The rotors 5A and 5B are provided outside the rotary cylinders 54A and 54B rotatably independently of the spindle 2, the rotary cylinders 54A and 54B having an insertion hole 541 through which the spindle 2 is inserted, as shown in FIG. 1. Around the inner periphery of the insertion hole 541 of the rotary cylinders 54A and 54B, the keys 55A and 55B engaging respectively the key grooves 23A and 23B of the spindle 2 are provided. The rotary cylinders 54A and 54B are urged toward the stator 4 by an inner wall on the other side of one chamber of the main body 1 and a partition plate 13.

Hence, if the spindle 2 is rotated, the rotary cylinders 54A and 54B are rotated by engagement between the keys 55A, 55B and the key grooves 23A, 23B and the rotors 5A and 5B are rotated at the same time.

In this embodiment, the first rotary encoder 3A and the second rotary encoder 3B have one stator 4 carried therebetween, with two rotors 5A and 5B disposed on both sides of the stator 4, as shown in FIG. 1. The stator 4 is fixed in the almost center of one chamber of the main body.

That is, the transmitting electrodes 42 and the receiving electrode 43 are provided on both faces of one stator 4. The first rotary encoder 3A is composed of one end face 4A of the stator 4 and the first rotor 5A. The second rotary encoder 3B is composed of the other end face 4B of the stator 4 and the second rotor 5B.

Further, the first rotor 5A is provided on the first rotary cylinder 54A, the first key 55A of the first rotary cylinder 54A engaging the first key groove 23A. Also, the second rotor 5B is provided on the second rotary cylinder 54B, the second key 55B of the second rotary cylinder 54B engaging the second key groove 23B.

Figure 3:
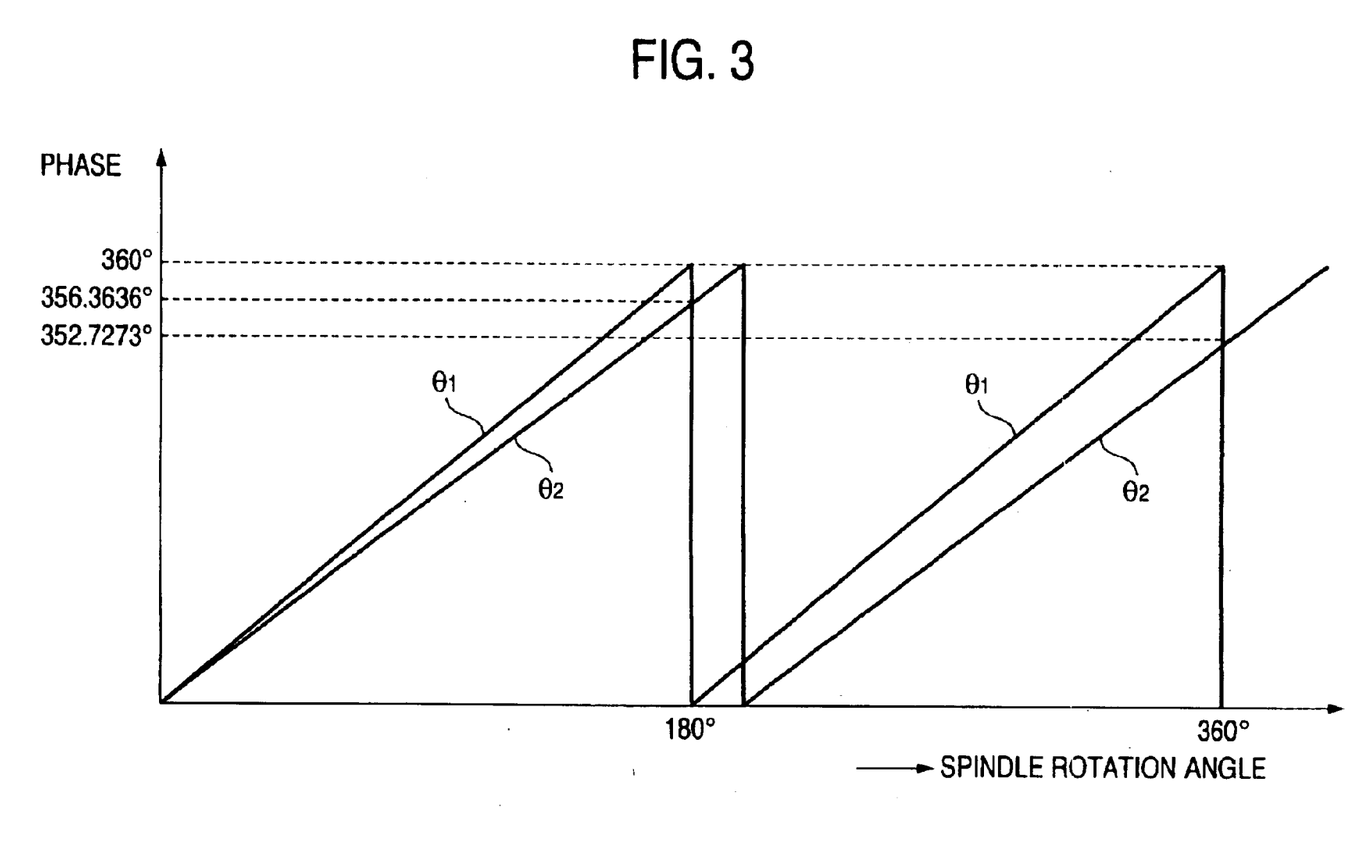
FIG. 3 is a graph representing the phase changes of a first rotor and a second rotor in the embodiment of the present invention.
Figure 4:
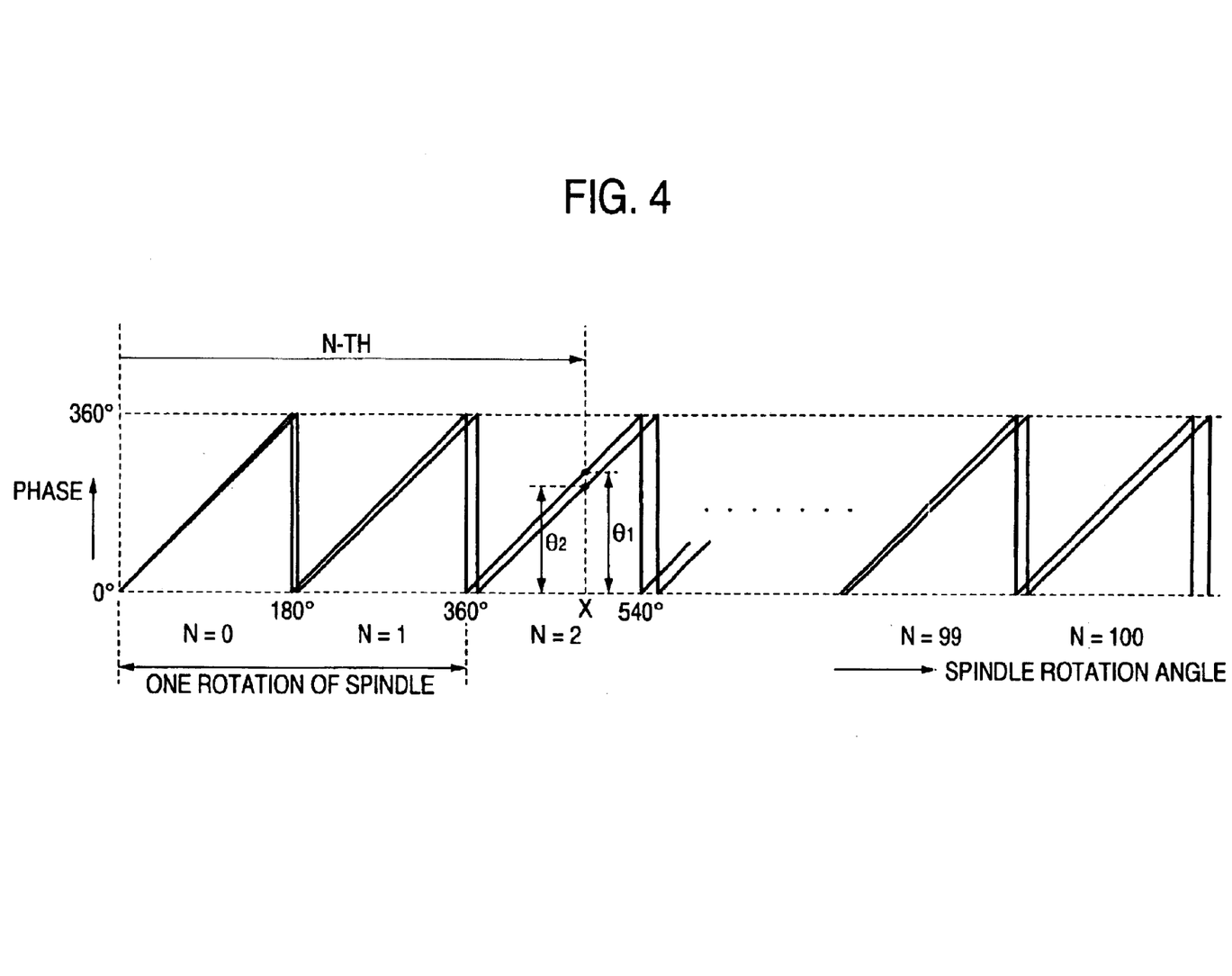
FIG. 4 is a graph showing the phase changes of the first rotor and the second rotor and the periodicity change of the first rotor in the embodiment of the present invention.

In this embodiment, if the rotors 5A and 5B are rotated half (180 degrees), a phase change of one period is obtained. Hence, if the spindle 2 is rotated 50 times, the first rotor 5A changes by 100 periods, as previously described. Hence, in order for the first rotor 5A and the second rotor 5B to have a different phase difference at any time, it is necessary for the second rotor 5B to change from 99 periods to 100 periods while the first rotor 5A changes by 100 periods. Hence, the second rotor 5B may cause a phase shift of 360 degrees per 99 periods (i.e., 49.5 rotations of the second rotor). From the above discussion, the second key groove 23B has a period difference $$360 \text{ (degrees)} \div 99 \text{ (periods)} = 3.6363 \text{ (degree/period)}$$

for the first key groove 23A per half rotation of the spindle 2. In this way, the first key groove 23A and the second key groove 23B are provided, whereby the phases $\theta_1$ and $\theta_2$ (rotational phase $\theta_1$ for the rotor 5A and rotational phase $\theta_2$ for the rotor 5B) are changed as the relative rotation amount of the rotors 5A and 5B to the stator 4, as shown in FIG. 3. The phase difference between the rotor 5A and the rotor 5B is varied in a movable area of the spindle 2 at any time, and has the relationship as shown in FIG. 4.

Figure 5:
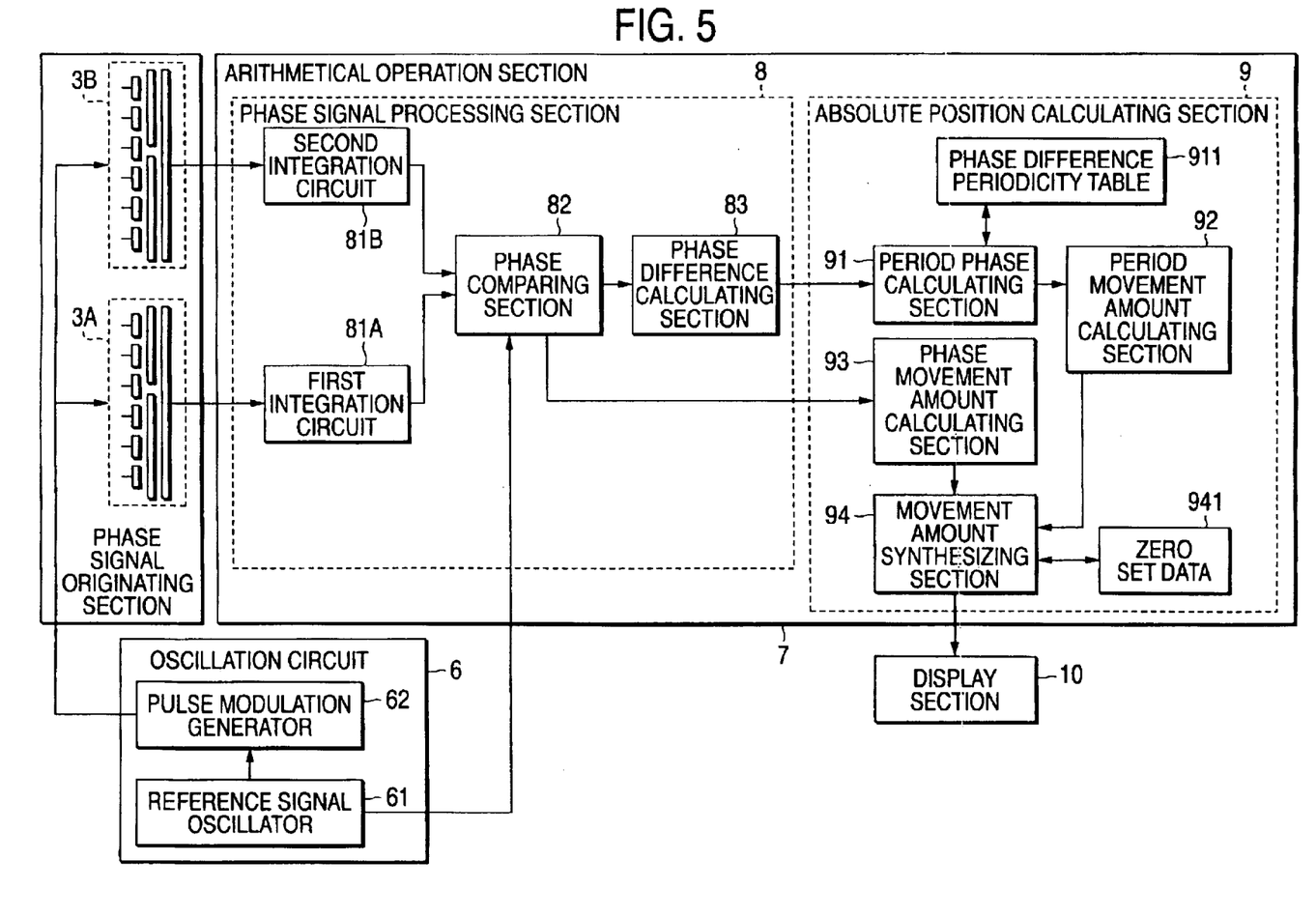
FIG. 5 is a block diagram for calculating the absolute position from the phase signal to be useful with this embodiment of the present invention.

The oscillation circuit 6 comprises a reference signal oscillator 61 for oscillating a reference signal of fixed period and a pulse modulation generator 62 as a phase modulator for pulse modulating the reference signal from the reference signal oscillator 61, as shown in FIG. 5.

The pulse modulation generator 62 modulates the reference signal from the reference signal oscillator 61 into an eight-phase AC signal having the phase shifted by every 45 degrees, which is sent to the electrodes corresponding to the transmitting electrodes 42.

In this constitution, if the spindle 2 is rotated, the spindle 2 is moved forth or back in the axial direction, and the rotors 5A and 5B are rotated. Then, the potential of each of the transmitting electrodes 42 arranged in the stator 4 is modulated by the pulse modulation generator 62, so that the potential of the coupling electrodes 52 disposed in the rotors 5A and 5B is changed by the combination of electrostatic couplings with the transmitting electrodes 42. This potential change of the coupling electrodes 52 appears as the potential change of the receiving electrode 43.

The arithmetical operation section 7 that processes a phase signal from the rotary encoders 3A and 3B to calculate the absolute position of the spindle 2 will be described below.

The arithmetical operation section 7 comprises a phase signal processing section 8 and an absolute position calculating section 9, as shown in FIG. 5.

The phase signal processing section 8 is a section for processing a phase signal originated from the first and second rotary encoders 3A and 3B to obtain the phase difference. The phase signal processing section 8 comprises a first integration circuit 81A into which a phase signal from the first rotary encoder 3A is input, a second integration circuit 81B into which a phase signal from the second rotary encoder 3B is input, a phase comparing section 82, and a phase difference calculating section 83.

The phase comparing section 82 compares the signal demodulated by the integration circuit 81A, 81B with the reference signal from the reference signal oscillator 61 to detect a relative rotation amount of the rotor 5A, 5B to the stator 4 as a shift from the reference signal, and to calculate the phase $\theta_1$ of the first rotor 5A and the phase $\theta_2$ of the second rotor 5B.

The phase difference calculating section 83 calculates a phase difference $\Delta\theta$ between the phases $\theta_1$ and $\theta_2$ obtained by the phase comparing section 82 and sends it the absolute position calculating section 9.

The absolute position calculating section 9 comprises a period phase calculating section 91, a period movement amount calculating section 92, a phase movement amount calculating section 93, and a movement amount synthesizing section 94.

The period phase calculating section 91 allocates the periodicity N every time the phase of the first rotor 5A is increased one period from a reference point where the phases of the first rotor 5A and the second rotor 5B are matched, and has a phase difference periodicity table 911 representing the relationship between the periodicity N and the phase difference $\Delta\theta$, as shown in FIG. 4. Because the phase difference $\Delta\theta$ is varied at different position of the spindle 2, there is a different width of phase difference $\Delta\theta$ at different periodicity. Namely, the phase difference periodicity table 911 stores the periodicities calculated in advance for the phase differences $\Delta\theta$, such that the periodicity is N when the phase difference $\Delta\theta$ is from k to 1 degrees, and the periodicity is (N+1) when the phase difference $\Delta\theta$ is from m to n degrees, and so on.

Hence, in the period phase difference calculating section 91, the periodicity N of the first rotor 5A is uniquely decided from the phase difference $\Delta\theta$ by referring to the phase difference periodicity table 911. Then, from this decided periodicity N, the phase variation amount $\theta_{1N}$ from the reference point by which the first rotor 5A has undergone up to the periodicity N is obtained. Namely, $\theta_{1N}=N\times 360°$.

The periodicity movement amount calculating section 92 calculates the movement amount $D_{1N}$ by which the spindle 2 has moved to become the phase variation amount $\theta_{1N}$ obtained by the period phase calculating section 91. Since the movement pitch per period of the spindle 2 is 0.25 mm, (Spindle movement amount $D_{1N}$ from the reference point up to the periodicity $N$)=$0.25\times(\theta_{1N}\div 360)$ whereby the movement amount $D_{1N}$ by which the spindle 2 has moved from the reference point up to the periodicity N is obtained.

The phase movement amount calculating section 93 calculates the spindle movement amount $D_1$ by which the spindle 2 has moved after the periodicity N up to the phase $\theta_1$, employing the phase $\theta_1$ of the first rotor 5A obtained by the phase comparing section 82. Namely, the spindle movement amount $D_1$ when the spindle 2 is rotated by phase $\theta_1$ is obtained.

(Spindle movement amount $D_1$ when rotated by phase $\theta_1$)=$0.25\times(\theta_1\div 360)$ whereby the spindle movement amount $D_1$ when the spindle 2 is rotated by phase $\theta_1$ is obtained.

The movement amount synthesizing section 94 synthesizes the spindle movement amount $D_{1N}$ from the reference point up to the periodicity N and the spindle movement amount $D_1$ when rotated by phase $\theta_1$ respectively obtained by the period movement amount calculating section 92 and the phase movement amount calculating section 93, to obtain the total movement amount $D_{1A}$ of the spindle 2 from the reference point.

(Total movement amount $D_{1A}$ of spindle from the reference point)=$D_{1N}+D_1$ whereby the total movement amount $D_{1A}$ of the spindle 2 from the reference point is obtained.

The movement amount synthesizing section 94 has the zero set data 941, with a difference between the zero set position of the spindle 2 and the reference point stored in advance.

Hence, the absolute position of the spindle 2 is obtained by deducting the zero set position from the movement amount of the spindle 2 from the reference point.

An absolute position signal is sent to and displayed on the display section 10.

Accordingly, the absolute position measuring device of the first embodiment as above constituted has the following effects.

In the first embodiment, the movement amount $D_{1N}$ of the spindle 2 up to $\theta_{1N}$ is obtained from the phase variation amount $\theta_{1N}$ of the first rotor 5A up to the periodicity N, and the movement amount $D_1$ of the spindle 2 in one period of the first rotor 5A is obtained from the phase signal $\theta_1$ of the first rotor 5A, whereby the total movement amount $D_{1A}$ of the spindle 2 is obtained by adding both the movement amounts.

The phase reflected to the absolute position of the spindle 2 is the phase signal of the first rotor 5A, and the phase difference is only employed to calculate the periodicity of the first rotor 5A. Hence, at the phase detection precision of the second rotor 5B, an error with the width where the periodicity is not misread is permissible. This has the advantage of compensating for the difficulty that the second key groove 23B is spirally provided.

In related art, the absolute position of the movable member was calculated by synthesizing the data obtained from all the non-dense and dense signals. Therefore, it was required to originate the non-dense and dense signals precisely, and work the phase detecting section precisely, with the difficulty of working the parts, and causing the cost to be increased.

However, in this embodiment, the signal reflected to the absolute position of the spindle 2 is the phase signal of the first rotor 5A, whereby it is only necessary that this first rotor 5A originates the phase signal precisely. Hence, the constitution of originating the phase signal of the second rotor 5B and detecting the phase signal does not require the precise work, whereby the working steps can be reduced and the cost lowered.

In this embodiment, the rotary encoder 3 is constituted in such a manner that the transmitting electrodes 42 and the receiving electrode 43 are provided on both faces of the stator 4, and the first rotor 5A and the second rotor 5B are opposed on both faces of the stator 4. Hence, one stator 4 is needed, resulting in the smaller number of parts and the lower cost.

(Second Embodiment)

Figure 6:
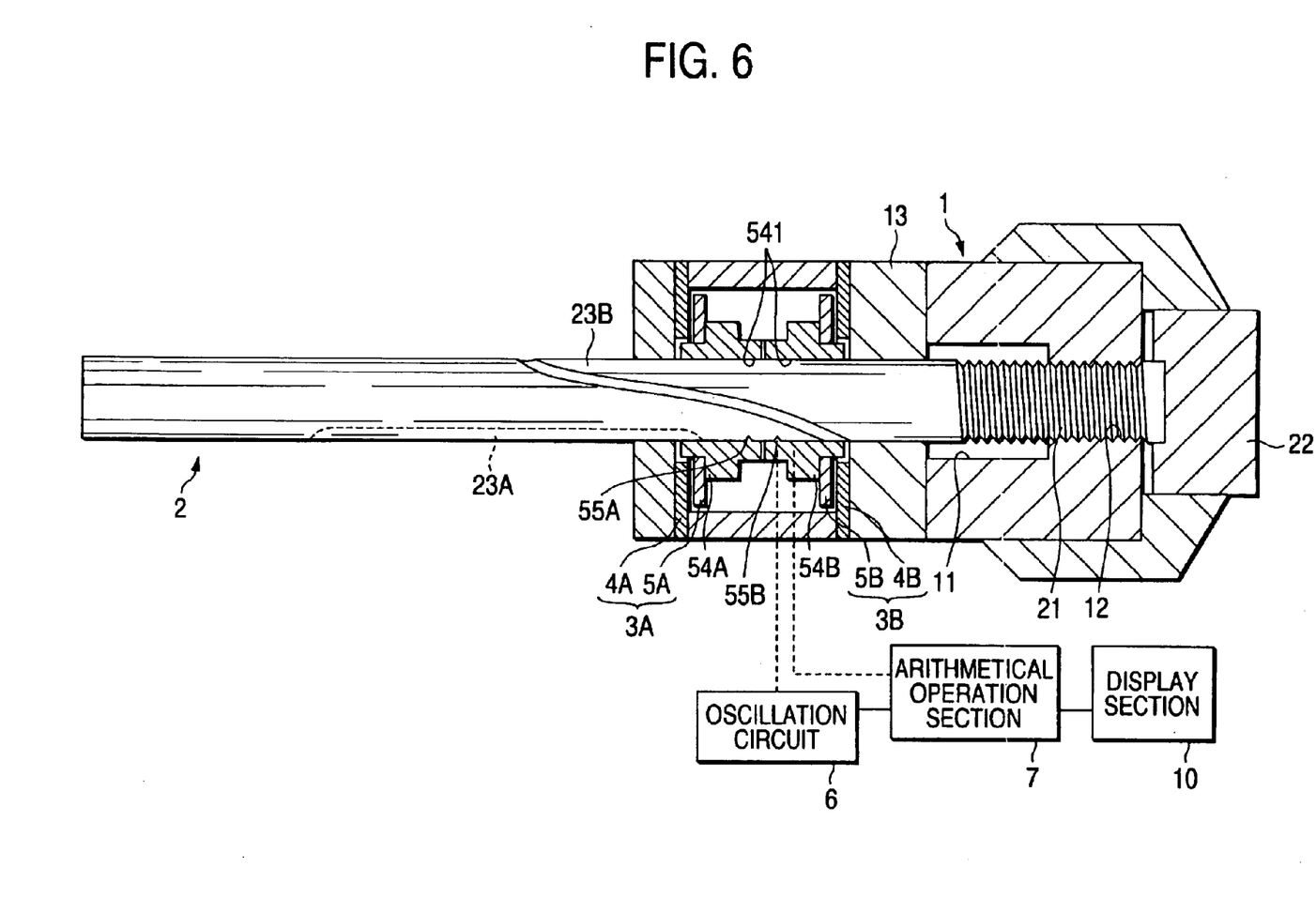
FIG. 6 is a cross-sectional view of an absolute position measuring device according to a second embodiment of the present invention.

FIG. 6 shows a micrometer head according to a second embodiment of the present invention.

The fundamental components of the second embodiment are the same as those of the first embodiment, whereby the same components are designated by the same numerals, and the description of the same components is omitted.

The second embodiment is different from the first embodiment in that two stators 4 are employed. Namely, the first stator 4A is fixed to an inner wall on the other side of one chamber of the main body 1, and the second stator 4 is fixed to the partition plate 13 of the main body 1. The first rotor 5A is opposed to the first stator 4A, and the second rotor 5B is opposed to the second stator 4B. Hence, the first and second rotors 5A and 5B are sandwiched between the first and second stators 4A and 4B. Furthermore, the keys 55A and 55B of the rotary cylinders 54A and 54B are provided in close proximity to each other.

With this constitution, two rotors 5A and 5B are provided adjacently. In this manner, the key grooves 23A and 23B are cut in a narrower range on the spindle 2. The spindle 2 has the feed screw 21 cut, but it is difficult that the feed screw 21 and the key grooves 23A, 23B are cut in the same area. Also, to miniaturize the micrometer itself, the other portion than the feed screw 21 itself is made as short as possible. With this embodiment, the key grooves 23A and 23B are cut in the minimum range, leading to the miniaturization of the micrometer itself.

The absolute position measuring device of this invention is not limited to the above embodiments, but may be changed or modified without departing from the scope or spirit of the present invention.

Figure 7A:
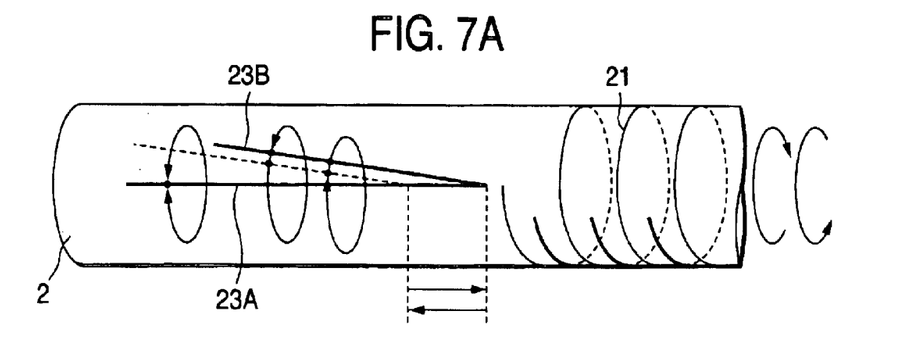
FIGS. 7A–7D are views exemplifying a first key groove and a second key groove for use with this invention.
Figure 7B:
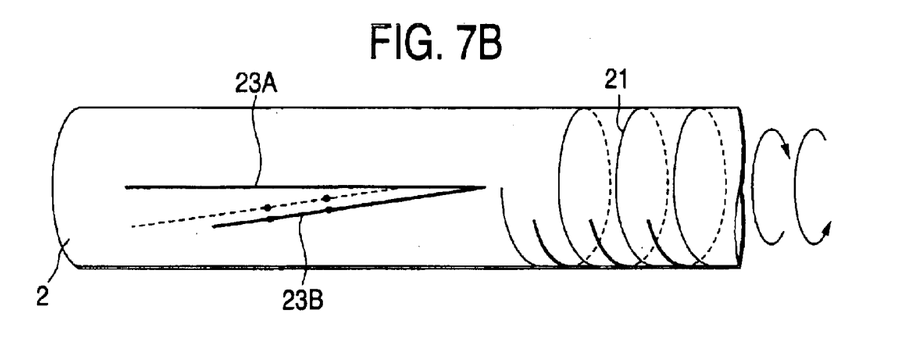
Figure 7C:
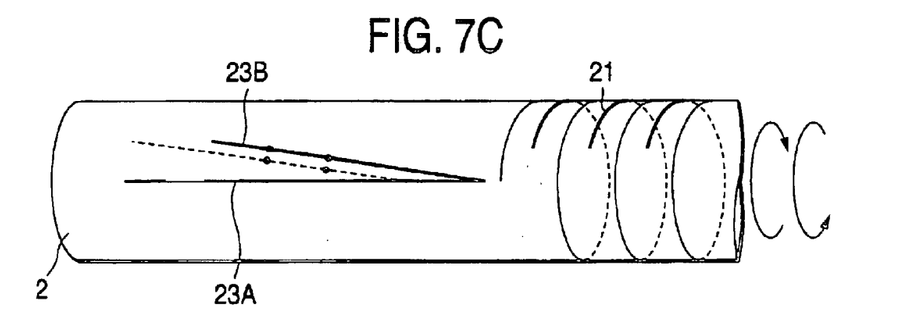
Figure 7D:
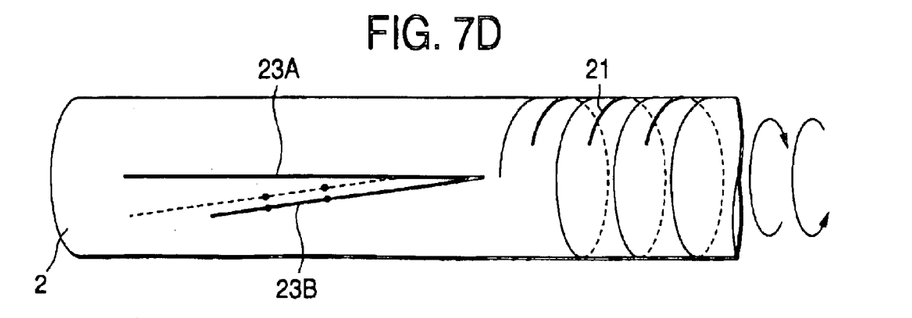

For example, the shape of two key grooves 23A and 23B may be a pattern as shown in FIGS. 7A–7D. FIG. 7A is a view in which the feed screw 21 of the spindle 2 is a right hand thread, and the second key groove 23B is a right handed spiral. Herein, the solid line and the broken line of the second key groove 23B indicate the state where the spindle 2 advances (or retreats) by rotation. FIGS. 7B, 7C and 7D are views showing the combinations of the cases in which the feed screw 12 is a right hand thread or left hand thread, and the second key groove 23B is a right handed spiral or left handed spiral.

In the above embodiments, the first key groove 23A is linear, and the second key groove 23B is spiral, but both the key grooves may be provided spirally.

In the above embodiments, in the phase signal processing section 8, two integration circuits are provided, including the first integration circuit 81A and the second integration circuit 81B, but one integration circuit may be provided. For example, when the movement of the spindle 2 is stopped, a signal from the first rotary encoder 3A may be firstly received, and then a signal from the second rotary encoder 3B may be received. With one integration circuit, it is possible to reduce the number of parts and miniaturize the device.

In the above embodiments, the key grooves 23A and 23B are provided on the spindle 2, and the keys 55A and 55B are provided on the rotary cylinders 54A and 54B of the rotors 5A and 5B. On the contrary, the keys may be provided on the spindle 2 and the key grooves may be provided on the rotary cylinders 54A and 54B, as shown in FIG. 8.

Figure 8:
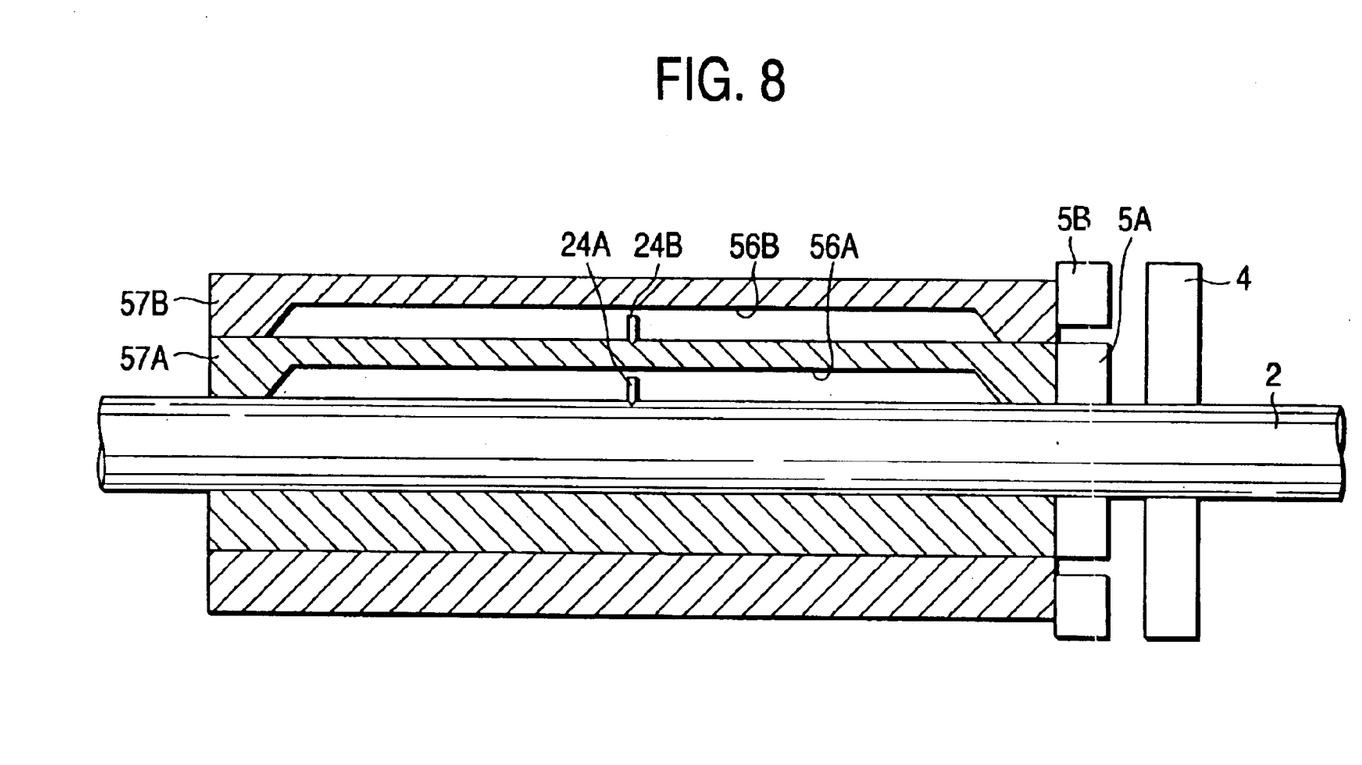
FIG. 8 is a view of the absolute position measuring device of the present invention, with a groove provided in a rotational cylinder.

In FIG. 8, the first rotor 5A is provided rotatably independently of the spindle 2, and the second rotor 5B is provided rotatably independently of the first rotor 5A and outside the first rotor 5A. The first rotor 5A has a first rotary cylinder 57A, and the second rotor 5B has a second rotary cylinder 57B.

The spindle 2 is provided with the first key 24A orthogonal to the axis of the spindle 2. The first rotor 5A is provided with a first key groove 56A linearly extending in parallel to the axis of the spindle 2, and the second key 24B outside it. The second rotary cylinder 57B is provided with a second key groove 56B having a lead angle different from that of the first key groove 56A. With this constitution, the first key 24A engages the first key groove 56A, and the second key 24B engages the second key groove 56B. Also, the second key groove 56B has a rotational phase difference of 7.272 degrees per rotation of the spindle 2 relative to the first key groove 56A.

With this constitution, the phase difference between the first and second rotors 5A and 5B can be obtained by rotating the first rotor 5A and the second rotor 5B in accordance with the rotation of the spindle 2. The first key groove 56A may not be linear, but has a lead angle different from that of the second key groove 56B, and a phase difference in different movable area of the spindle 2.

In the above embodiments, two sets of rotary encoders are provided, but three or more rotary encoders maybe provided. If three or more rotary encoders are employed, three phase signals of different periods can be obtained. If the phase differences of three phase signals are different values, the movable area of the spindle 2 can be longer than when two rotary encoders are employed, because the absolute position of the spindle 2 is obtained in this invention.

The pitch of the feed screw 12 for the spindle 2 and the period of the rotors 5A and 5B are not limited to those of the above embodiments, but may be set at various values.

Figure 9:
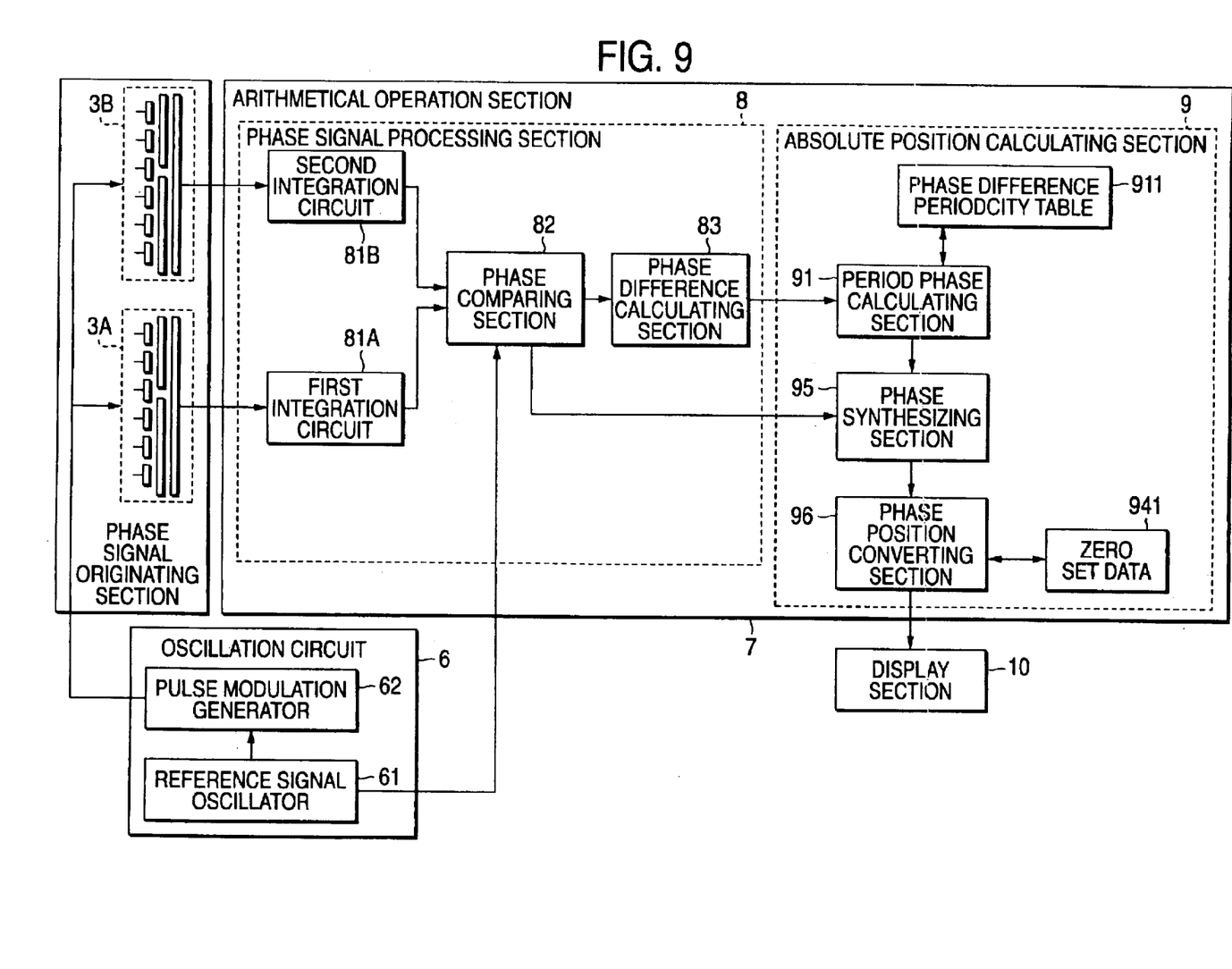
FIG. 9 is a block diagram showing a variation example for calculating the absolute position from the phase signal in the absolute position measuring device of the present invention.

In the above embodiments, the movement amount $D_{1N}$ of the spindle 2 up to $\theta_{1N}$ is obtained from the phase variation amount $\theta_{1N}$ of the first rotor 5A up to the periodicity N, and the movement amount $D_1$ of the spindle 2 in one period of the first rotor 5A is obtained from the phase signal $\theta_1$ of the first rotor 5A, whereby the total movement amount $D_{1A}$ of the spindle 2 from the reference point is obtained by adding both the movement amounts. However, other methods for calculating the absolute position of the spindle 2 may be also conceived. For example, the phase variation amount $\theta_{1N}$ of the first rotor 5A up to the periodicity N and the phase signal $\theta_1$ of the first rotor 5A may be added by the phase synthesizing section 95 to obtain the total phase variation amount $\theta_{1A}$ of the first rotor 5A from the reference point and calculate the absolute position of the spindle 2 in the phase position converting section 96, as shown in FIG. 9.

Various methods for calculating the periodicity N other than that of the above embodiments may be also employed. For example, the periodicity N may be obtained from the phase difference $\Delta\theta$, using the relational expression, in the period phase calculating section 91. Furthermore, the total phase $\theta 1A$ may be directly obtained from the phase difference $\Delta\theta$, using the relational expression, without obtaining the periodicity.

The absolute position measuring device of this invention is not limited to that for moving the movable member by rotation. For example, it can be applied to the sliding movement of the calipers or the spindle movement of the dial gauge. In essence, the absolute position measuring device of the present invention is applicable, as long as the phase difference can be detected in accordance with the movement amount of the movable member.

Also, the section for detecting the phase is not limited to the electrostatic capacity type, but maybe the photoelectric or magnetic type.

As above described, with this invention, the absolute position measuring device can detect the absolute position correctly in smaller size and with simple constitution.

What is claimed is:

1. An absolute position measuring device comprising:

a main body;

a movable member having an axis and provided movably forth and back in said main body along an axial direction;

a phase signal originating section for originating two or more phase signals of different periods in accordance with an amount of movement of said movable member; and an arithmetical operation section for making an arithmetical operation on said phase signals to obtain an absolute position of said movable member, said arithmetical operation section including a phase signal processing section for comparing said phase signals to obtain a phase difference between said phase signals, and an absolute position calculating section for calculating the absolute position of said movable member from the phase difference obtained by said phase signal processing section, wherein said phase signal originating section is provided rotatably about said axis, and said two or more phase signals have different phase differences at different positions of said movable member in a movable area of said movable member.

2. The absolute position measuring device according to claim 1, wherein said absolute position calculating section calculates a periodicity to which any one of said phase signals corresponds from a reference point on the basis of said phase difference, calculates the amount of movement of said movable member corresponding to a phase variation amount based on the periodicity, and the amount of movement of said movable member corresponding to a phase variation amount of any one of said phase signals, and calculates a total amount of movement of said movable member by synthesizing the amount of movement of said movable member based on said periodicity and the amount of movement of said movable member corresponding to the phase variation amount of any one of said phase signals, thereby calculating the absolute position of said movable member.

3. The absolute position measuring device according to claim 1, wherein said absolute position calculating section calculates a periodicity to which any one of said phase signals corresponds from a reference point on the basis of said phase difference, calculates a total phase variation amount from the phase variation amount based on the periodicity and a phase variation amount of any one of said phase signals, and calculates the absolute position of said movable member on the basis of said total phase variation amount.

4. The absolute position measuring device according to claim 1, wherein said movable member is a spindle provided to be movable forth or back by rotation in axial direction thereof, and said phase signal originating section comprises two sets of rotary encoders having a stator fixed to said main body and a rotor opposed to said stator and provided rotatably in conjunction with the rotation of said spindle, wherein said two rotors have different rotational periods, and a different phase difference at a different position of said spindle in the movable area of said spindle.

5. The absolute position measuring device according to claim 4, wherein said spindle is inserted independently rotatably through a center of rotation of said rotor and has two key grooves provided around the outer periphery of said spindle, said two rotors are provided with keys engaging said key grooves, and said two key grooves are provided such that said two rotors have different rotational periods, and a different phase difference at a different position of said spindle in the movable area of said spindle.

6. The absolute position measuring device according to claim 5, wherein said two key grooves have different lead angles in the axial direction of said spindle.

7. The absolute position measuring device according to claim 6, wherein one of said two key grooves is linearly provided in parallel to the axial direction of said spindle, and the other key groove is provided spirally around the axis of said spindle.

8. The absolute position measuring device according to claim 5, wherein one of said two key grooves is linearly provided in parallel to the axial direction of said spindle, and the other key groove is provided spirally around the axis of said spindle.

9. The absolute position measuring device according to claim 4, wherein said two sets of rotary encoders comprise one common stator and two rotors sandwiching said stator.

10. The absolute position measuring device according to claim 4, wherein said two sets of rotary encoders comprise two stators and two rotors disposed between said two stators.

11. The absolute position measuring device according to claim 4, wherein said two rotors consist of a first rotor and a second rotor, said spindle being inserted independently rotatably through the center of rotation of the first and second rotors, a first key is provided around an outer periphery of said spindle, said first rotor has a first key groove engaging said first key and a second key around an outer periphery thereof, said second rotor has a second key groove engaging said second key, wherein said two key grooves are provided such that said two rotors have different rotational periods, and a different phase difference at a different position of said spindle in the movable area of said spindle.

12. The absolute position measuring device according to claim 11, wherein said first key groove and said second key groove have different lead angles in the axial direction of said spindle.

13. The absolute position measuring device according to claim 11, wherein said first key groove is linearly provided in parallel to the axial direction of said spindle, and said second key groove is provided spirally around the axis of said spindle.

14. The absolute position measuring device according to claim 12, wherein said first key groove is linearly provided in parallel to the axial direction of said spindle, and said second key groove is provided spirally around the axis of said spindle.

15. The absolute position measuring device according to claim 4, wherein said phase signal originating section comprises:

transmitting electrodes, which are provided at regular intervals along a circumferential direction of said stator, for accepting a phase signal from a phase modulator that originates a reference signal of fixed frequency shifted by every 360/n (n is a natural number);

a coupling electrode, which is provided in said rotor, for electrostatically coupling with said transmitting electrodes at a corresponding circumferential position;

a receiving electrode, which is provided in said stator, for electrostatically coupling with said coupling electrode; and a phase signal processing section for converting an electric signal from said receiving electrode into a rotational phase of the rotor.

* * * * *